United States Patent [19]

Otto et al.

[11] 4,401,714
[45] Aug. 30, 1983

[54] CORROSION RESISTANT POSITIVE ELECTRODE FOR HIGH-TEMPERATURE, SECONDARY ELECTROCHEMICAL CELL

[75] Inventors: Neil C. Otto, Chicago; Barry T. Warner, South Holland; John A. Smaga, Lemont; James E. Battles, Oak Forest, all of Ill.

[73] Assignee: The United States of America as represented by the United States Department of Energy, Washington, D.C.

[21] Appl. No.: 395,872

[22] Filed: Jul. 7, 1982

[51] Int. Cl.³ .................. H01M 4/58; H01M 4/66
[52] U.S. Cl. ................................ 429/221; 429/245; 429/232; 29/623.5
[58] Field of Search ............... 429/221, 232, 245; 204/1.2; 252/182.1; 29/623.5

[56] References Cited

U.S. PATENT DOCUMENTS

| 4,011,374 | 3/1977 | Kaun ................... 429/221 |
| 4,029,860 | 6/1977 | Kaun ................... 429/122 |
| 4,110,517 | 8/1978 | Arntzen ............... 429/133 |
| 4,313,259 | 2/1982 | Kaun et al. ......... 29/623.5 |

OTHER PUBLICATIONS

ANL-79-94, High-Performance Batteries for Electric-Vehicle Propulsion and Stationary Energy Storage, ANL Progress Report, Oct. 1978–Sep. 1979, pp. 31, 36–40 and 159–161, 1980.
ANL-81-65, Lithium/Iron Sulfide Batteries for Electric-Vehicle Propulsion and Other Application, ANL Progress Report, Oct. 1980–Sep. 1981, pp. 31 & 32, Feb. 1982.
ANL-81-38, ANL Chemical Engineering Division Annual Technical Report, 1980, pp. 4 and 25, distributed Sep. 1, 1981.
ANL-80-38, Lithium/Iron Sulfide Batteries for Electric-Vehicle Propulsion and Other Applications, ANL Progress Report for Oct. 1979–Sep. 1980, p. 146, distributed Jul. 28, 1981.

*Primary Examiner*—Donald L. Walton
*Attorney, Agent, or Firm*—Hugh W. Glenn; Robert J. Fisher; Richard G. Besha

[57] ABSTRACT

The corrosion rate of low carbon steel within a positive electrode of a high-temperature, secondary electrochemical cell that includes FeS as active material is substantially reduced by incorporating therein finely divided iron powder in stoichiometric excess to the amount required to form FeS in the fully charged electrode. The cell typically includes an alkali metal or alkaline earth metal as negative electrode active material and a molten metal halide salt as electrolyte. The excess iron permits use of inexpensive carbon steel alloys that are substantially free of the costly corrosion resistant elements chromium, nickel and molybdenum while avoiding shorten cell life resulting from high corrosion rates.

12 Claims, 3 Drawing Figures

CORROSION RESISTANT POSITIVE ELECTRODE FOR HIGH-TEMPERATURE, SECONDARY ELECTROCHEMICAL CELL

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to electrodes for high-temperature, secondary electrochemical cells that can be formed into batteries and used as power sources for electric vehicles, storage of off-peak generated electrical power and various other applications. It is particularly applicable to positive electrodes employing metal sulfides as active material within electrochemical cells with molten metal halide salt as electrolyte.

The type of electrochemical cells contemplated are those that include transition metal sulfides as the positive electrode reactant and alkali metals such as lithium in the form of solid alloys as the negative electrode material. As an alternative, alkaline earth metals such as calcium and alloys of these metals can be selected as negative electrode material. These high-temperature cells employ molten salt electrolytes generally including the halides of the alkali metals or of the alkaline earth metals. During operation of these cells the transition metal sulfide discharges to alkali metal sulfide or alkaline earth metal sulfide in the positive electrode. This electrochemical environment is very corrosive and has required particular attention to the selection of corrosive resistant materials of construction.

Various electrochemical cells with corrosive environments are illustrated in an number of earlier U.S. patents. U.S. Pat. No. 4,313,259 to Kaun et al illustrates an electrochemical cell with a plurality of electrodes with perforated electrically conductive metal containment as current collectors. Another cell design with plate-like electrodes is illustrated in U.S. Pat. No. 4,110,517 to Arntzen. A compartmented or honeycombed current collector structure is illustrated in U.S. Pat. No. 4,029,860, while U.S. Pat. No. 4,011,374 to Kaun shows the use of thermosetting resin as moldable material containing the electrode active material.

These high powered electrochemical cells with corrosive molten salt electrolyte at elevated temperatures have presented substantial problems in the selection of suitable corrosion resistant materials for containment structures and current collectors. Corrosion resistant materials such as molybdenum, nickel and chromium and alloys of these metals have been used in an effort to prolong cell life under such corrosive conditions. These materials are very expensive and add substantially to the cost of high powered electrochemical cells employing them.

In an effort to produce less expensive cells, FeS has been selected as the positive electrode active material in combination with current collectors of low-carbon steel. Corrosion rates with the FeS material are substantially less than those with the more reactive $FeS_2$ active material in the positive electrode. However, after long term operation substantial corrosion occurs to low-carbon steel current collectors and containment structures in cells with FeS positive electrodes.

Therefore, in view of the above it is an object of the present invention to provide a positive electrode for use in a high-temperature, secondary electrochemical cell with improved corrosion characteristics respecting low-carbon steel components.

It is another object of the present invention to provide a positive electrode with iron sulfide active material in mixture with metal halide electrolytic salt with inexpensive low carbon steel components of extended life.

It is still another object to provide a positive electrode that exhibits low corrosion rates in its current collector components without use of costly corrosion resistant alloys.

It is a further object to provide an improved method of preparing a positive electrode for use in a high-temperature, secondary electrochemical cell with molten metal halide electrolyte to reduce corrosion of low-carbon steel components.

In accordance with the present invention, a positive electrode is presented for use in a high-temperature, secondary electrochemical cell opposite to a negative electrode with alkali metal or alkaline earth metal as active material. The positive electrode contains metal sulfide that can include FeS, alkali metal sulfide, alkaline earth metal sulfide or mixtures thereof depending on whether the electrode is in the charged, uncharged or partially charged state. The metal sulfide is in mixture with finely divided iron powder in sufficient amount to be a stoichiometric excess of Fe as FeS to the amount of combined sulfur in the metal sulfide. The mixture is in contact with a current collector structure consisting essentially a low-carbon steel.

In more specific aspects of the invention, the low carbon steel includes no more than 0.5% carbon and is substantially free of the alloying elements nickel, chromium and molybdenum commonly used to improve corrosion resistance. Such costly elements are included at no more than 0.1% by weight. In further aspects, the finely divided iron powder is included in uniform mixture with a metal halide electrolyte and particulate FeS. The finely divided powder of about 40 to 100 micrometers diameter is included at about 15–40 mole percent excess to that required to form FeS in the fully charged electrode.

In other aspects of the invention, a method is presented for preparing a positive electrode for use in a high-temperature, secondary electrochemical cell. The cell includes FeS as the positive electrode reactant, an alkali metal or alkaline earth metal as the negative reactant and a metal halide electrolyte. The formation of the positive electrode includes the step of adding finely divided iron powder in sufficient excess to the FeS to substantially improve the corrosion resistance of low-carbon steel current collector components contacting the positive electrode material.

BRIEF DESCRIPTION OF THE DRAWINGS

The present invention is illustrated in the accompanying drawings wherein.

DETAILED DESCRIPTION OF THE PREFERRED EMBODIMENT

Figure 1:
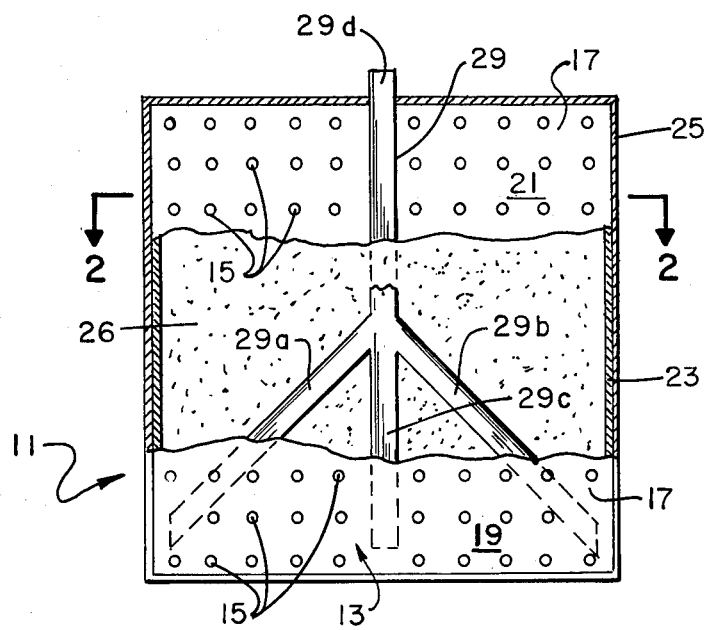
FIG. 1 is an elevation view, partially in section, of an electrode for use in a high-temperature, secondary electrochemical cell.
Figure 2:
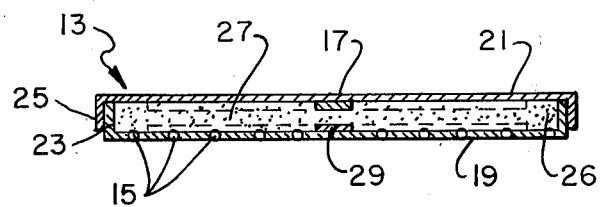
FIG. 2 is a cross-sectional view of the electrode of FIG. 1.

FIGS. 1 and 2 illustrate one electrode structure for use in a high-temperature, secondary electrochemical cell. A plurality of such electrodes are shown assembled within an electrochemical cell in U.S. Pat. No. 4,313,259 entitled "Method for Manufacturing an Electrochemical Cell" to Kaun. For this purpose, this patent is specifically incorporated by reference herein.

The electrode 11 includes an outer enclosure 13 of rigid electrically conductive trays having openings 15 at least over the major side surfaces 17 of the electrode. The openings 15 may be provided by perforation, etching, expanding or other suitable process. The positive electrode is illustrated with two oppositely facing trays 19 and 21 with each tray including a flat sheet at its major side surface and laterally extending flanges 23 and 25 at the parametric edge surfaces of the electrode. The two trays are disposed with their flanges in oppositely facing alignment such that they engage to enclose a central and expandable electrode compartment 27 for containing the positive electrode active material 26.

The internal surface of each tray is illustrated with an attached electrical conductor 29 that is shown extending from top to bottom of the electrode. The lower portion of conductor 29 is illustrated with branches 29a and 29b angling from the conductor trunk portion 29c to provide additional rigidity to the side surfaces. The upper portion of the electrical conductor extends as a tab 29d beyond the electrode structure for electrical connection to a suitable bus bar within the cell. Both the perforated trays 19 and 21 and the electrical conductive strips 29 serve as the current collector structure for the illustrated positive electrode. In accordance with the present invention, these structures and components are provided of low-carbon steel notwithstanding the corrosive environment of this positive electrode and the electrochemical cell in which it is assembled.

It will be clear that the illustrated electrode structure is only one of a wide variety of positive electrodes and electrochemical cell structures that can incorporate the improved positive electrode of the present invention. Various frames, shapes and types can be included. Current collectors of screen, reticulated structures, cellular or honeycombed type structures and flat sheets of electrically conductive material are contemplated within the scope of these teachings. Each of these containment and current collector structures for positive electrodes in high-temperature, secondary electrochemical cells can be provided of economical carbon steel compositions. Such compositions are the AISI steel alloy series 1006 to 1040 and include carbon content of no more than about 0.5% by weight. Such steel compositions may include small amounts of phosphorous, sulfur and manganese as is well documented. These low cost compositions are substantially free of elements commonly added into corrosion resistant alloys such as molybdenum, nickel and chromium. These elements are expensive materials and can substantially increase the cost of construction materials. Accordingly, through use of the improvements described herein these costly corrosion resistant elements are unnecessary in applicants' current collector and containment structures. Although suitable low cost steel alloys may contain trace quantities of these corrosion resistant elements, they need not be present at levels of more than 0.1% weight percent each.

In one manner of preparing a positive electrode, particulate iron sulfide is blended in about equal volume amounts with powdered or molten metal halide electrolyte and formed into the desired electrode shape by present technologies such as hot and cold pressing, extruding, injection molding, etc. The mixture can be compacted within a containment structure or held in the desired shape by carbon bonding techniques such as those described in the citations given in the Background of the Invention.

In order to decrease the corrosion rate of the positive electrode current collector structures, iron powder in a finely divided state is added to the electrode mixture. The iron is preferably provided in smaller particle size than that of the FeS. Iron sulfide is typically provided in a powdered form with particle sizes of about 100–300 microns. Accordingly, particle sizes of about 40–100 microns corresponding to $-150$ to $+325$ mesh U.S. Sieve series are preferred for the iron powder. The iron powder in this finely divided state has been found to protect low-carbon steel current collectors and other structures from corrosive action when distributed throughout the FeS positive electrode mixture.

This finely divided iron powder is provided in sufficient amount to be at least 15 mole percent excess to that required to combine with sulfur in the electrode as FeS. For cells assembled in the fully charged state the finely divided iron is included at about 15 mole percent to the FeS present in the positive electrode. Alternatively, the electrode may be assembled in the uncharged or partially charged state such that the total iron content of the electrode mixture is provided at a level that is at least 15 mole percent greater than the combined sulfur content of the FeS and $Li_2S$ within the positive electrode composition.

The particulate mixture of FeS, $Li_2S$, Fe and electrolyte can be formed into the positive electrode structure by various well-known methods. For instance the two oppositely facing trays of FIGS. 1 and 2 may be conveniently used to compact and form the powdered mixture into the central chamber defined between the trays. It will also be clear that various other forming and extrusion techniques can be applied to powdered and paste mixtures in forming the positive electrode with active materials in contact with the low carbon steel current collectors and containment structures.

Figure 3:
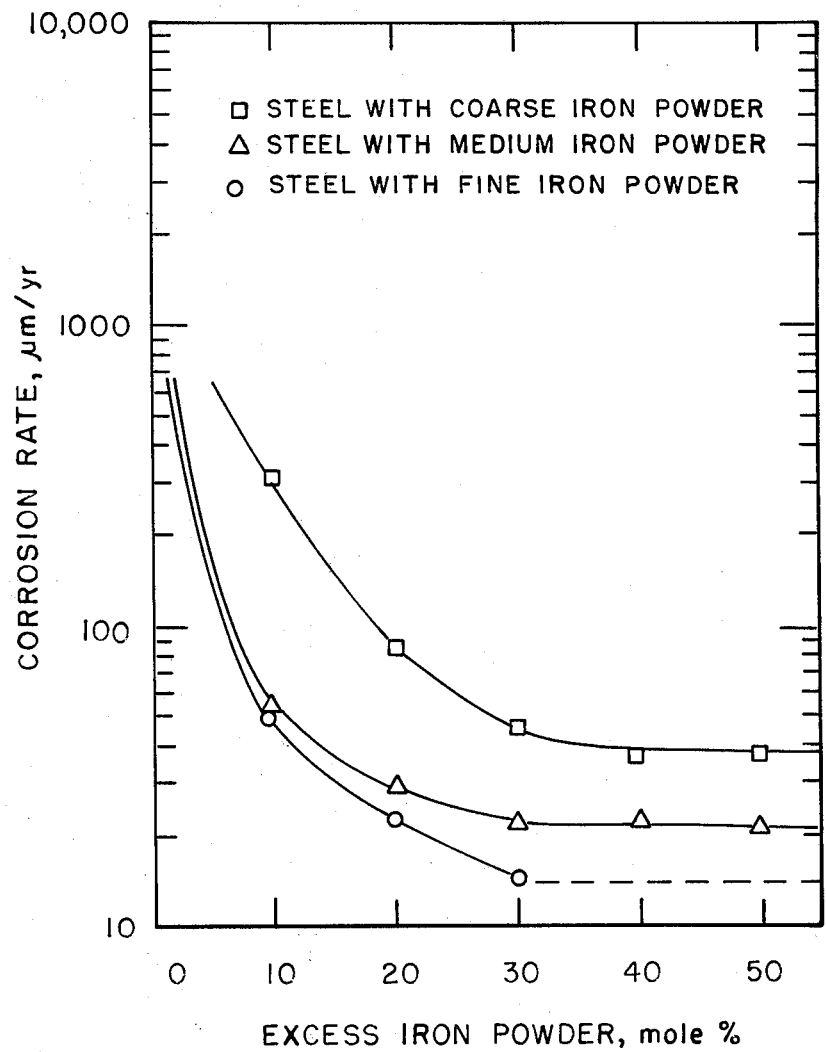
FIG. 3 is a graph of corrosion rate vs. excess iron powder for various concentrations and size ranges of iron powder.

FIG. 3 illustrates the corrosion rates of low-carbon steel coupons (AISI 1008) exposed to FeS and LiCl/KCI electrolyte at 450° C. Iron powder was added in various amounts to the various samples in course particle sizes of about 150–300 microns, medium particle sizes of about 75–150 microns and fine particles of about 40–75 microns. It is seen that excess iron powder in about 15–40 mole percent and most preferably at about 30 mole percent of FeS provides substantial reduction in corrosion rates. Additions of iron powder in excess of 40 mole percent provide little decrease in corrosion rate while additions less than 15 mole percent show greatly accelerated rates of corrosion. It also is seen that the most preferred concentration of excess iron powder is at about 30 mole percent in respect to the iron sulfide or other metal sulfides in the composition.

FIG. 3 also illustrates the effectiveness of adding the iron powder to the positive electrode composition in a finely divided state. A finely divided powder appears to react more readily with corrosive agents within the electrode to protect the current collector and containment structures of low-carbon steel. The addition of powder preconditions the positive electrode environment to protect its low-carbon steel components from excess corrosion. It is thus seen that without this protection, corrosion rates of up to 1000 micrometers per year of low-carbon steel (AISI 1008) can occur. In the same environment protected by finely divided iron powder rates as low as 15-20 micrometers per year corrosion are obtained.

The following examples are presented to illustrate the present invention.

COMPARATIVE EXAMPLE I

A secondary electrochemical cell with about 45 ampere-hours positive electrode capacity of FeS, LiCl-KCl electrolyte, boron nitride felt separators and lithium-aluminum alloy, negative electrode was assemblied in the 80% charged state. The cell was operated for about 52 days and 61 cycles at about 465° C., between voltage cut-off of about 0.95 and 1.65 at charge and discharge current densities of about 50 mA/cm$^2$ following several break in cycles at about 20 mA/cm$^2$. The positive electrode material was contained within an AISI 1008 carbon steel frame with screens at its major side surface and included a centrally located flat plate current collector also of AISI 1008 carbon steel. Following this operation substantial corrosion of the current collector and frame structure was noted.

EXAMPLE II

An electrochemical cell of substantially the same structure was assembled with about 30 mole percent excess iron powder (75-100 microns) within the positive electrode composition. The cell was operated in a manner substantially similar to that in Comparative Example I with substantial reduction in the corrosion rate of the low carbon steel frame and current collector. Additional data and corrosion rates are presented below in Table I.

TABLE I

| Example | Test Duration Days | Cycles | Mean % Util. | A-h Eff. (%) | Mean Cor. Rate (μm/yr) Collector | Frame |
|---|---|---|---|---|---|---|
| I | 52 | 61 | 78.0 | 99+ | 110 | 120 |
| II | 60 | 67 | 82.0 | 99+ | 34 | 30 |

It is therefore seen from the above that the present invention including the addition of finely divided iron powder to the metal sulfide electrode materials substantially reduces the corrosion rate of steel components within the positive electrode structure. In the particular examples given, corrosion rate reductions of approximately 70% were realized. The present invention thus provides a positive electrode structure and a method of its construction that permits the use of economical low carbon steel components within high-temperature, molten salt electrochemical cells while permitting their operations over extended periods of time. It is also seen that the use of the corrosion resistant materials such as molybdenum, chromium and nickel that have previously been selected in alloy form as additives in steel alloys can be avoided while still maintaining acceptably low corrosion rates within positive electrode compositions employing iron sulfide.

Although the present invention is described in terms of specific materials, structures and procedures, it will be clear to one skilled in the art that various modifications can be made within the scope and spirit of the following claims.

The embodiments of this invention in which an exclusive property or privilege is claimed are defined as follows:

1. A positive electrode for use in a high-temperature, secondary electrochemical cell opposite to a negative electrode including alkali metal or alkaline earth metal as active material, said positive electrode comprising a metal sulfide selected from the group consisting of FeS, alkali metal sulfide, alkaline earth metal sulfide and mixtures thereof; finely divided iron powder sufficient to provide a stoichiometric excess of Fe as FeS to the amount of combined sulfur in said metal sulfide and a current collector structure consisting essentially of low-carbon steel contacting the metal sulfide.

2. The positive electrode of claim 1 wherein the current collector of low carbon steel includes no more than about 0.5% by weight carbon and is substantially free of the corrosion resistant, alloying elements nickel, chromium, and molybdenum.

3. The positive electrode of claim 2 wherein the corrosion resistant elements are each included in the current collector structure at no more than 0.1% by weight.

4. The positive electrode of claim 1 wherein the current collector structure is selected from the group of structures consisting of a flat sheet, a honeycombed cellular structure, a perforated sheet, a reticulated structure, and a perforated containment structure for the positive electrode material.

5. The positive electrode of claim 1 wherein the finely divided iron powder is included in uniform mixture with particulate FeS and is of a particle size generally less than that of the particulate FeS.

6. The positive electrode of claim 1 wherein the iron powder is provided as fine powder of about 40-100 micrometers in generally uniform mixture with particulate FeS of about 100-300 micrometers and a metal halide electrolyte.

7. The positive electrode of claim 1 in the fully charged state including about equal volume portions of FeS and an alkali metal halide electrolyte in mixture with finely divided iron powder of about 15-40 mole percent excess in respect to the FeS.

8. The positive electrode of claim 1 in at least partially uncharged state including a mixture of FeS, Li$_2$S, alkali metal halide and finely divided iron powder in at least 15 mole percent excess to that required to combine with Li$_2$S in accordance with the reaction: Fe+Li$_2$S=FeS+2Li.

9. The positive electrode of claim 8 wherein the iron powder is included in about 30 mole percent in excess to the Li$_2$S and FeS present in the electrode.

10. In a method of preparing a positive electrode for use in a high-temperature, secondary electrochemical cell including FeS as positive electrode active material and an alkali metal or alkaline earth metal as negative electrode active material, said method including steps of combining FeS with a metal halide electrolyte and forming the combined ingredients in contact with a current collector structure consisting essentially of low carbon steel substantially free of the corrosion resistant, alloying elements chromium, nickel and molybdenum, the improvement comprising including in the combined ingredients finely divided iron powder in an amount of 15-40 mole percent to the FeS in the fully charged positive electrode.

11. The method of claim 10 wherein the finely divided iron powder is included in particle sizes of about 40–100 micrometers at about 30 mole percent to the FeS present in the electrode at its fully charged state.

12. In a method of preparing a positive electrode for use in a high-temperature, secondary electrochemical cell including metal sulfide as positive electrode active material and alkali metal or alkaline earth metal as negative electrode active material said method including the steps of preparing the positive electrode in at least the partially uncharged state by combining a metal sulfide selected from FeS, $Li_2S$ and mixtures thereof with a metal halide electrolytic salt and forming the combined ingredients in contact with a current collector structure consisting essentially of a low-carbon steel substantially free of the corrosion resistant, alloying elements chromium, nickel and molybdenum, the improvement comprising including in mixture with the combined ingredients, finely divided iron powder sufficient to provide a stoichiometric excess of about 15–40 mole percent of Fe as FeS to that of the combined sulfur in the metal sulfide of the positive electrode.

* * * * *